April 15, 1958  P. SAMMARCO  2,830,704
CONVEYING AND SEPARATING MECHANISM FOR CORN SHELLERS
Filed Oct. 24, 1955

Inventor
Peter Sammarco
Paul O. Pippel
Atty.

United States Patent Office 2,830,704
Patented Apr. 15, 1958

2,830,704

CONVEYING AND SEPARATING MECHANISM FOR CORN SHELLERS

Peter Sammarco, Chicago, Ill., assignor to International Harvester Company, a corporation of New Jersey Application October 24, 1955, Serial No. 542,282

3 Claims. (Cl. 209—296)

This invention relates to corn picker shelling mechanism of the type which is adapted to be mounted and carried from the associated tractor.

A general object of the invention is to provide a novel mechanism wherein the parts are arranged in a novel manner to provide for an effective transition for the flow of the corn from one component to another.

A more specific object of the invention is to provide a novel material separator and arrange the same in such a manner so as to effectively receive and convey the shelled corn, husks and cobs and the like from an associated shelling mechanism.

These and other objects of the invention will become more apparent from the specification and the drawings, wherein.

Figure 1:
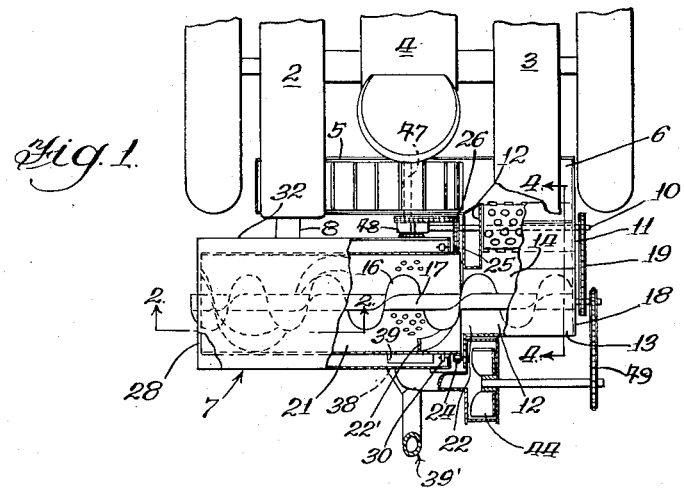
Figure 1 is a fragmentary plan view of the novel shelling mechanism shown partially in horizontal section on line 1—1 of Fig. 2 in association with a tractor fragmentary shown.
Figure 2:
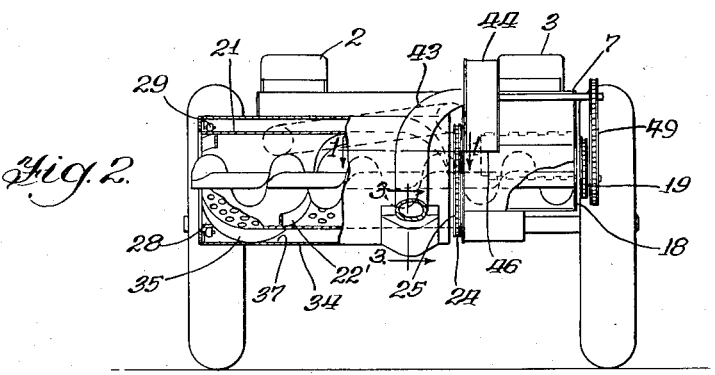
Figure 2 is a rear view of the structure shown in Figure 1 partially vertical in section on line 2—2 of Figure 1.
Figures 3, 4:
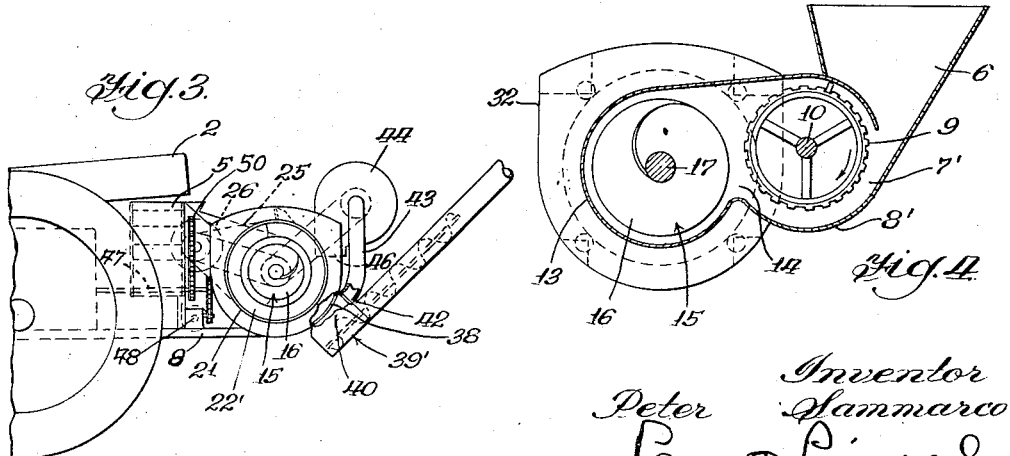

Figure 3 is a side elevational view of the structure shown in Figures 1 and 2 taken from the left side thereof and partially in section on line 3—3 of Figure 2, and Figure 4 is an enlarged sectional view taken substantially on the line 4—4 of Figure 1.

The invention is shown in a two-row corn picker comprising the picker unit of 2 and 3 which are mounted on the tractor structure 4, the unit 2 discharging into a cross-conveyor 5 which with the unit 3 discharges into the hopper 6 of the corn shelling mechanism generally designated 7. The sheller 7 which is not per se part of this invention except as it enters into the combinations hereinafter described is claimed and described in a companion application Serial No. 515,367 filed June 14, 1955, in the name of Ernest C. Carlson and is suitably carried from the tractor 4 by the framework 8 which is connected to the rear axle structure of the tractor.

As best seen in Figure 4 the hopper 6 leads into the shelling chamber 7' which comprises a concave 8' underposed with respect to the shelling cylinder 9 which is substantially identical with that shown in the beforementioned application and comprises the support shaft 10 rotatably carried from suitable bearings on the spaced shelling cage side walls 11 and 12 in between which is disposed the concave 8' and connected thereto.

The feature of the present invention is the disposition and arrangement of an auger conveyor with its housing 13 generally parallel to the shelling cylinder 9 and the location of a receiving opening 14 on one side in radial alignment with the shelling cylinder so that the material is swept rearwardly transaxially of the cylinder 9 in response to rotation thereof as indicated by the arrow in Figure 4. This provides for an efficient exit and flow of the material from the shelling mechanism with sufficient force so that it is thrown into the auger conveyor generally designated 15 which comprises the flight 16 connected to a central core shaft structure 17. The shaft 17 is mounted on the end wall 18 at one end of the generally cylindrical housing structure 13. The shaft 17 extends outwardly of the said wall 18 and is driven by a chain and sprocket system 19 from the shaft 10 of the shelling cylinder 9.

It will be seen in Figures 1 and 2 that the auger conveyor extends through a perforated drum 21 which is disposed in receiving relationship to the discharge end 22 of the housing 13. The perforated drum 21 is substantially coaxial with the auger 15 and is provided with an internal auger flight 22' which is spiraled in the same direction as the auger flight 16 and revolves in the same direction as the auger 15 but at a slower speed. The drive for drum 21 is in the form of a ring gear 24 which is connected to the external side of the cylindrical sieve 21 and driven by a chain 25 from a sprocket 26 on the shaft 10 of the shelling cylinder 9.

Thus the grain which is shelled by the shelling mechanism is transferred to the auger mechanism 15 and from it is transferred into the sifting chamber 21 and in view of the relative speeds between the auger 15 and the cylinder 21 material is not only agitated between the auger flights 22' and 16 but is also constantly being moved out of the discharge end 28 of the cylinder 21 and from thence deposited upon the ground. It will be observed that the sifting cylinder 21 is carried from a plurality of rollers 29 and 30 which are supported by an enclosing housing structure 32 which encases the sifting cylinder 21. The housing portion 32 has a curved bottom 34 over which sweeps the auger flight 35 on the external side of the drum 21 and which is spiraled in reverse direction as respects to the spiral of the auger flight 22' and thus moves the material on the surface 37 on the bottom of the housing inwardly toward a discharge opening 38. The drum 21 is provided with radial paddles 39 in alignment with opening 38 for constantly moving the material out of the housing 32 through opening 38 into the associated elevator conveyor 39' which is suitably connected to the wall structure of a housing 32. It will be seen that the upper part of the transition chamber 40 which conducts the material from the opening 38 into the conveyor 39' is connected at its upper end through an opening 42 to one end of a conduit 43 which is connected to a fan 44 which is also suitably carried on the housing structure 32, the fan 44 serving to draw up chaff and other light material out of the corn and discharge it through its discharge or outlet end 46 onto the ground, whereas the grain is augered up into the conveyor 39' into a suitable trailing wagon.

It will be seen that the drive for the various units is from the power take-off 47 of the tractor and through a gear box 48 to shaft 10 which drives the transmission 19 and then the transmission 49 for fan 44.

The power take-off shaft also drives the apron 5 through the drive means 50.

What is claimed:

1. In a conveying and classifying apparatus for use in separating corn from an aggregate of husks and cobs and the like, the combination of a first auger having an external flight, a housing portion encasing one end of said first auger and having an aggregate receiving opening, a sifter drum sleeved over the remainder of said auger and disposed in end to end relation to said housing portion for receiving the aggregate from said housing portion pursuant to operational rotation of said first auger, said drum having a discharge end, said sifter drum having radial openings for sifting corn therethrough, said drum having an internal auger flight disposed in opposing relation to said flight of said first auger and cooperative therewith for tumbling the aggregate therebetween and cooperatively conveying the aggregate to said discharge end of the drum, and means rotatably driving said first auger and said drum at a differential in speeds.

2. In a separating mechanism, an auger having an external flight, a perforated sifter drum telescoped thereover and having a receiving end and a discharge end, an internal auger flight on said drum closely spaced to the external flight on said auger and reactively cooperative therewith, and formed and arranged to move aggregate from said receiving to said discharge end of said drum pursuant to rotation of the auger and drum.

3. The invention according to claim 1 and means for driving said drum and said auger at relatively different speeds.

References Cited in the file of this patent

UNITED STATES PATENTS

| | | |
|---|---|---|
| Re. 23,083 | Andrews | Feb. 8, 1949 |
| 1,533,997 | Stinson | Apr. 14, 1925 |
| 1,743,833 | Stall | Jan. 14, 1930 |
| 1,761,346 | Jelbart | June 3, 1930 |
| 2,484,999 | Hyman | Oct. 18, 1949 |

FOREIGN PATENTS

| | | |
|---|---|---|
| 315,161 | Germany | Oct. 30, 1919 |